United States Patent [19]

Okauchi

[11] Patent Number: 4,811,127
[45] Date of Patent: Mar. 7, 1989

[54] MAGNETIC RECORDING AND REPRODUCING APPARATUS

[75] Inventor: Takeshi Okauchi, Chigasaki, Japan

[73] Assignee: Victor Company of Japan, Ltd., Japan

[21] Appl. No.: 109,816

[22] Filed: Oct. 16, 1987

[30] Foreign Application Priority Data

Oct. 22, 1986 [JP] Japan ................................. 61-251524
Oct. 22, 1986 [JP] Japan ................................. 61-251525

[51] Int. Cl.$^4$ ............................................... G11B 5/02
[52] U.S. Cl. ......................................... 360/68; 360/27
[58] Field of Search ....................... 360/68, 27, 61, 62

[56] References Cited

FOREIGN PATENT DOCUMENTS 0154485 11/1985 European Pat. Off. .
3217557 11/1982 Fed. Rep. of Germany .

Primary Examiner—Vincent P. Canney

[57] ABSTRACT

A magnetic recording and reproducing apparatus has a function of recording data on a control track of a magnetic tape by varying a duty cycle of a control pulse signal which is recorded on the control track. The apparatus stops a data recording operation when it is detected that a tape speed mode is changed from a standard play mode to an extended play mode or vice versa, so as to minimize dropout of positive polarity pulses of a reproduced control pulse signal after the tape speed mode is changed and also minimize erroneous recording of data.

9 Claims, 7 Drawing Sheets

MAGNETIC RECORDING AND REPRODUCING APPARATUS

BACKGROUND OF THE INVENTION

The present invention generally relates to magnetic recording and reproducing apparatuses, and more particularly to a magnetic recording and reproducing apparatus which records and reproduces data on and from a control track of a magnetic tape by varying the duty cycle of a control pulse signal.

Recently, there is a proposed method of recording data on a control track of a magnetic tape on a magnetic recording and reproducing apparatus (hereinafter referred to as a video tape recorder or simply VTR) for home use employing the existing standards, by varying the duty cycle of the control pulse signal recorded on the control track without affecting a control operation which is originally carried out in the VTR based on the control pulse signal. The control operation includes a control of a head servo system and/or a control of a tape transport system.

The data which is recorded and reproduced on and from the control track may be comment or character data, address data, index data and the like. For example, the comment or character data are used to display characters in a predetermined area of a reproduced picture, the address data are used to detect an absolute address on the magnetic tape, and the index data are used as a cue for searching a certain position on the magnetic tape.

However, according to the proposed VTR, a switching pulse signal for controlling a control head between a reproducing state and a recording state when recording the data on the control track is formed from positive polarity pulses of the reproduced control pulse signal. For this reason, when a tape speed mode of the VTR is changed from a standard play mode to an extended play mode in which the play time is extended compared to that in the standard play mode, the period of the positive polarity pulses of the reproduced control pulse signal becomes short but the timing of the switching pulse signal remains unchanged from that in the standard play mode. As a result, it is impossible to detect the change in the tape speed mode from the standard play mode to the extended play mode, and there is a problem in that a correct control operation cannot be carried out based on the reproduced control pulse signal because the positive polarity pulses of the extended play mode drop out.

On the other hand, when the tape speed mode of the VTR is changed from the extended play mode to the standard play mode, the timing with which the data on the control track are recorded or rewritten is constant and remains unchanged from that in the extended play mode. For this reason, there is no guarantee that the data on the control track will be correctly recorded by intended data, that is, that the duty cycle of the control pulse signal will be varied to a desired duty cycle when the tape speed mode changes to the standard play mode.

SUMMARY OF THE INVENTION

Accordingly, it is a general object of the present invention to provide a novel and useful magnetic recording and reproducing apparatus in which the problems described heretofore are eliminated.

Another and more specific object of the present invention is to provide a magnetic recording and reproducing apparatus which stops a data recording operation when it is detected that a tape speed mode is changed from a standard play mode to an extended play mode or vice versa. According to the apparatus of the present invention, it is possible to minimize dropout of positive polarity pulses of a reproduced control pulse signal after the tape speed mode is changed, and also minimize erroneous recording of data.

Still another object of the present invention is to provide a magnetic recording and reproducing apparatus having a function of recording data on a control track of a magnetic tape by varying a duty cycle of a control pulse signal which has a constant period and is recorded on the control track, where the control track extends along a longitudinal direction of the magnetic tape. The magnetic recording and reproducing apparatus comprises a control head for recording and reproducing the control pulse signal on and from the control track of the magnetic tape, a switching circuit controlled to ON and OFF states responsive to a switching pulse signal for passing a reproduced control pulse signal reproduced from the control track by the control head in the ON state thereof, where the reproduced control pulse signal is made up of first polarity pulses and second polarity pulses, a recording circuit for recording the data on the control track by the control head by varying the duty cycle of the control pulse signal in the OFF state of the switching circuit, a timing generating circuit for generating the switching pulse signal having a pulse width which is sufficiently long so that only the first polarity pulses of the reproduced control pulse signal from the switching circuit can be extracted in a first tape speed mode in which a period of the reproduced control pulse signal is relatively long and the switching pulse signal is generated based on the extracted first polarity pulses, and a control circuit for detecting the second polarity pulses of the reproduced control pulse signal when the tape speed mode changes to a second tape speed mode in which the period of the reproduced control pulse signal is relatively short and for controlling the timing generating circuit responsive to the second polarity pulses so that the timing generating circuit generates a switching pulse signal for maintaining the switching circuit in the ON state. According to the apparatus of the present invention, it is possible to minimize dropout of the first polarity pulses of the reproduced control pulse signal after the tape speed mode is changed from the first tape speed mode to the second tape speed mode.

A further object of the present invention is to provide a magnetic recording and reproducing apparatus having a function of recording data on a control track of a magnetic tape by varying a duty cycle of a control pulse signal which has a constant period and is recorded on the control track, where the control track extends along a longitudinal direction of the magnetic tape. The magnetic recording and reproducing apparatus comprises a control head for recording and reproducing the control pulse signal on and from the control track of the magnetic tape, a switching circuit controlled to ON and OFF states responsive to a switching pulse signal for passing a reproduced control pulse signal reproduced from the control track by the control head in the ON state thereof, where the reproduced control pulse signal is made up of first polarity pulses and second polarity pulses, a recording circuit for recording the data on the control track by the control head by varying the duty cycle of the control pulse signal in the OFF state of the switching circuit, a timing generating circuit for generating the switching pulse signal having such a pulse width that only the first polarity pulses of the reproduced control pulse signal from the switching circuit can be extracted in a first tape speed mode in which a period of the reproduced control pulse signal is relatively short and the switching pulse signal is generated based on the extracted first polarity pulses, a counter circuit for counting a predetermined set value corresponding to the pulse width of the switching pulse signal, where the counter circuit starts a counting operation responsive to a rise in the switching pulse signal and automatically ends the counting operation responsive to a fall in the switching pulse signal and the counting operation of the counter circuit is forcibly stopped responsive to the first polarity pulses of the reproduced control pulse signal, and a control circuit for controlling the recording circuit to stop the recording of the data on the control track responsive to the end of the counting operation of the counter circuit when the tape speed mode changes to a second tape speed mode in which the period of the reproduced control pulse signal is relatively long. According to the apparatus of the present invention, it is possible to minimize recording of erroneous data on the control track when the tape speed mode is changed from the first tape speed mode to the second tape speed mode.

Other objects and further features of the present invention will be apparent from the following detailed description when read in conjunction with the accompanying drawings.

DETAILED DESCRIPTION

First, a description will be given on the VTR previously proposed in a Japanese patent application No. 61-66159 in which the applicant in the same as the assignee of the present application, so as to facilitate the understanding of the advantageous features of the present invention.

Figure 1:
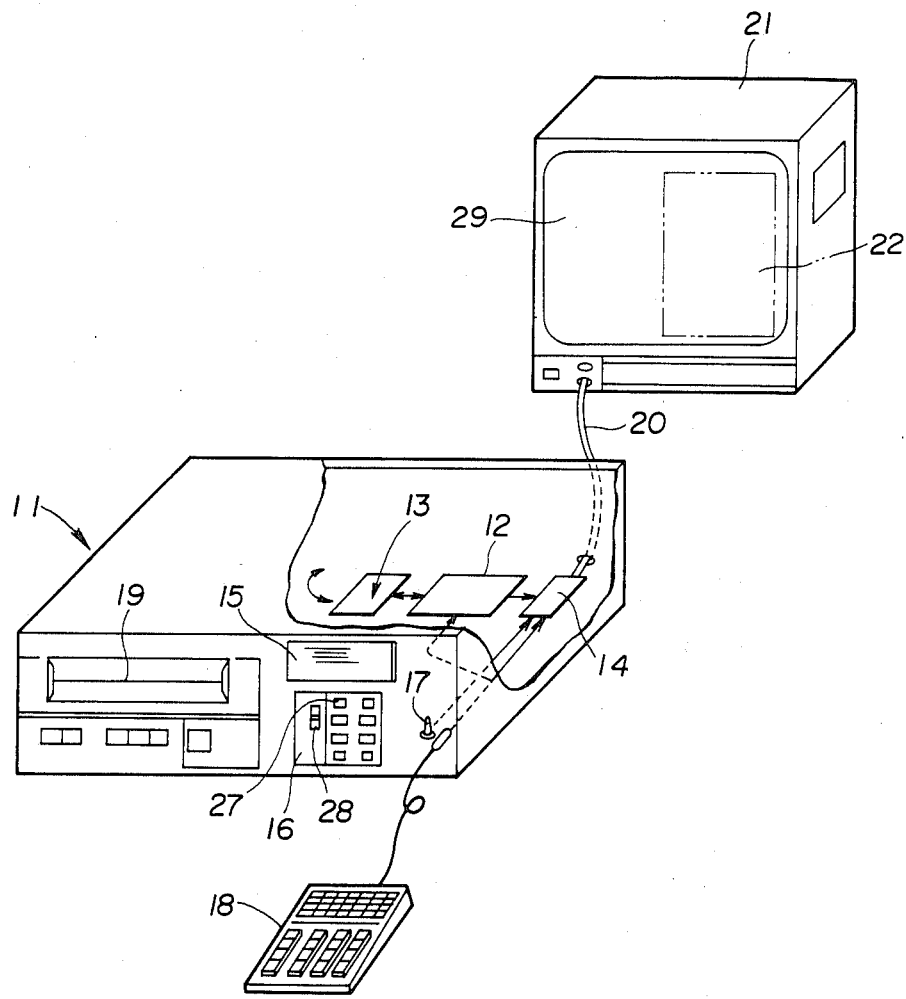
FIG. 1 is a perspective view generally showing the previously proposed magnetic recording and reproducing apparatus together with a monitoring display unit.

FIG. 1 generally shows the previously proposed VTR together with a monitoring display unit. As will be described later, a VTR 11 comprises a one-chip microcomputer 12, a read/write circuit 13, a character generator 14 and the like. A display part 15 similar to that of the existing VTR is provided on a front panel of the VTR 11. In addition, a manipulation part 16 for selecting recording and reproduction modes and a character output ON/OFF switch 17 are provided on the front panel of the VTR 11. A keyboard 18 for entering data is coupled to the VTR 11. As in the case of the existing VTR, the front panel of the VTR 11 is provided with a lid 19 for closing an inserting opening through which a tape cassette (not shown) is inserted and extracted into and from the VTR 11, other switches for controlling the operation of the VTR 11 and the like.

The VTR 11 is coupled to a monitoring display unit 21 through a cable 20. The monitoring display unit 21 is supplied with reproduced video and audio signals from the VTR 11 and data which are recorded and reproduced on the VTR 11.

A comment-on-screen switch 28 of the manipulation part 16 is used to change the display on a screen 29 of the monitoring display unit 21. The switch 28 has three positions, namely, an "ON" position, an "OFF" position and a "SCROLL" position. When the switch 28 is in the "ON" position, the characters "KEY IN" and "TAPE OUT" are displayed in a lower portion of the screen 29, up to ten characters are displayed on the right of the character display "KEY IN" on the same line as this character display "KEY IN", and up to ten characters are displayed on the right of the character display "TAPE OUT" on the same line as this character display "TAPE OUT". The up to ten characters displayed beside the character display "KEY IN" are entered from the keyboard 18, while the up to ten characters displayed beside the character display "TAPE OUT" are comment data reproduced from a control track of a magnetic tape as will be described later. Hereunder, a display mode in which the switch 28 is in the "ON" position will be referred to as a two-line display mode.

No character display is made on the screen 29 when the switch 28 is in the "OFF" position.

When the switch 28 is in the "SCROLL" position, up to nine lines each having up to ten characters are displayed within an area 22 indicated by two-dot chain lines on the screen 29. The characters displayed within the area 22 are reproduced from the control track of the magnetic tape. Hereunder, a display mode in which the switch 28 is in the "SCROLL" position will be referred to as a scroll display mode. In the scroll display mode, no display in the two-line display mode is made.

Figure 2:
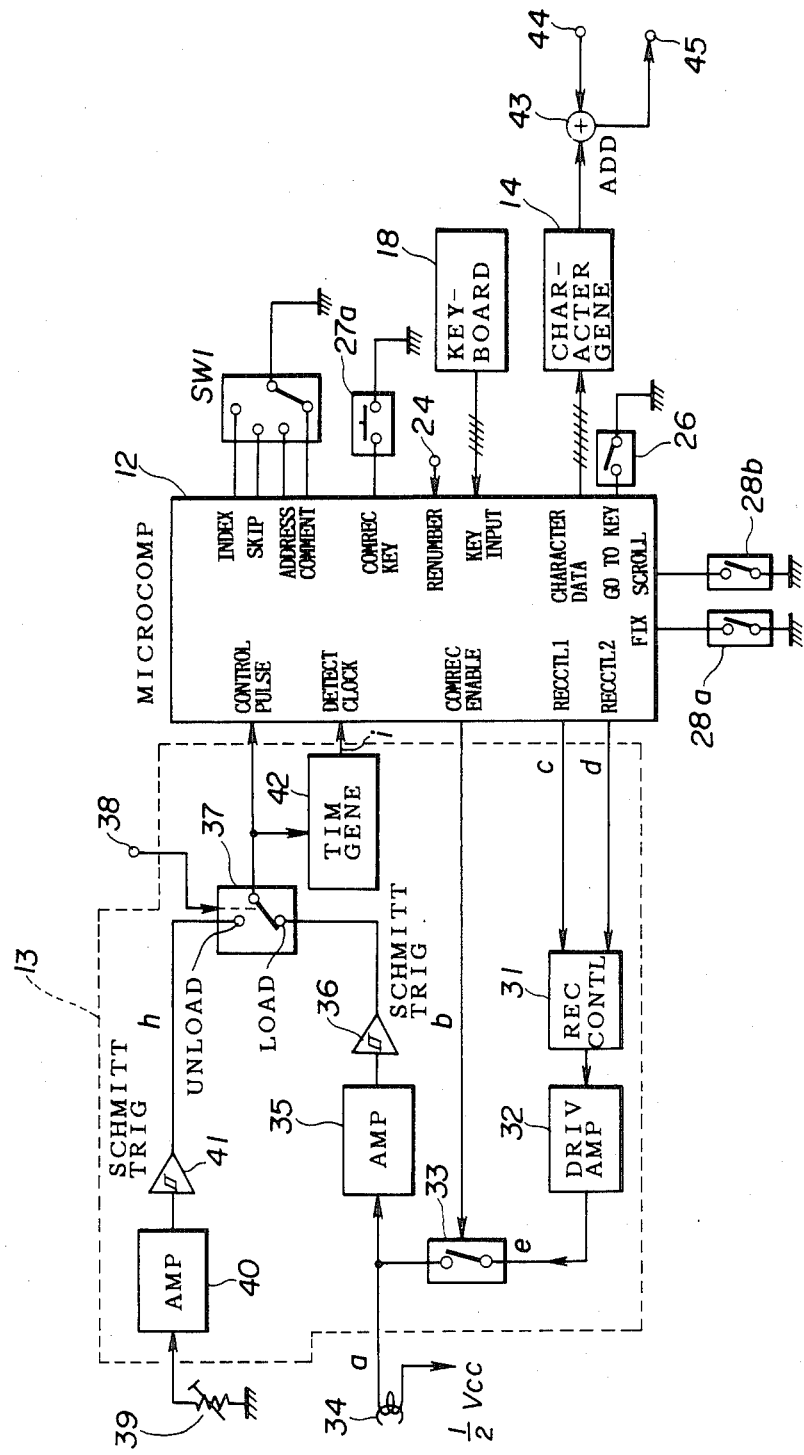
FIG. 2 is a system block diagram showing an essential part of the previously proposed magnetic recording and reproducing apparatus.

Next, a description will be given on the construction and operation of the VTR 11, by referring to FIG. 2. In FIG. 2, those parts which are the same as those corresponding parts in FIG. 1 are designated by the same reference numerals. It will be assumed for convenience' sake that four kinds of data can be recorded on the control track of the magnetic tape. A data switch SW1 selects the kind of data to be recorded out of special function data, address data, character data and index data (index signal). The VTR 11 is set to record the special function data, the address data, the character data or the index signal on the control track when a low-level signal is applied to a corresponding terminal SKIP, ADDRESS, COMMENT or INDEX of the microcomputer 12 responsive to the position of the switch SW1. The index data or signal is made up of constant values which are repeatedly recorded a constant number of times.

When the VTR 11 is in a data recording mode, the microcomputer 12 discriminates from the signal obtained from the switch SW1 the kind of data to be recorded on the control track and generates the data with a predetermined format depending on the data entered from the keyboard 18 or the like. The data recording mode is selected during a reproduction mode, so that the desired kind of data are recorded on the control track of the magnetic tape while reproducing a video signal from tracks formed obliquely to the longitudinal direction of the magnetic tape simultaneously as the reproduction of the control pulse signal from the control track. Hence, the user may arbitrarily record his comments and the like on the control track of the magnetic tape which is pre-recorded with the video signal. Although a description thereof will be omitted in the present specification, an audio signal is also recorded on the magnetic tape.

In the reproduction mode of the VTR 11, the microcomputer 12 discriminates whether or not a comment rewrite switch 27a is closed (a comment rewrite key 27 in FIG. 1 is pushed) immediately after it is discriminated that the index signal is the data to be recorded on the control track. On the other hand, the microcomputer 12 discriminates whether or not the comment rewrite switch 27a is closed after storing in a data memory (random access memory, RAM) an address code entered in numbers from the keyboard 18 or from character keys of the manipulation part 16 when it is discriminated that the address data are the data to be recorded on the control track. In the reproduction mode, the user monitors the reproduced picture on the monitoring display unit 21 and pushes the comment rewrite key 27 at a position where he wishes to record the data on the control track.

When the microcomputer 12 discriminates that the comment rewrite key 27 is pushed, the microcomputer 12 controls the read/write circuit 13 so that the duty cycle of the control pulse signal is varied for every bit depending on the format of the data to be recorded on the control track in phase synchronism with positive polarity pulses of the reproduced control pulse signal obtained thereafter. The control of the read/write circuit 13 is carried out until the recording of the data on the control track is completed. The positive polarity pulses of the reproduced control pulse signal are portions of the reproduced control pulse signal which are essential for carrying out a control operation including a control of a head servo system and a control of a tape transport system.

Next, a description will be given on the data recording operation during the reproduction mode, by referring to FIGS. 3(A) through 3(F). The pre-recorded magnetic tape on which the data are to be recorded on the control track is accommodated within the tape cassette and is loaded into the VTR 11 in the state accommodated within the tape cassette. In the recording and reproduction modes, the magnetic tape is drawn out of the tape cassette which is in a loaded position within the VTR 11 and is wrapped obliquely around an outer peripheral surface of a rotary drum which is mounted with rotary magnetic heads for a predetermined angular range. In this state, the magnetic tape is in a predetermined tape path in contact with the rotary drum and is transported by a capstan which pinches the magnetic tape together with a pinch roller. In the reproduction mode, a control head 34 shown in FIG. 2 reproduces the control pulse signal from the control track of the magnetic tape, where the control track is formed along the longitudinal direction of the magnetic tape. The reproduced control pulse signal is used to control the head servo system which keeps the rotational phase of the rotary heads constant and to control the tape transport system which keeps the rotational phase of the capstan constant.

At the time of the recording, the control pulse signal is a square wave signal. However, at the time of the reproduction, a reproduced control pulse signal a has a waveform shown in FIG. 3(A) and comprises positive polarity pulses at positions corresponding to rises in the recorded square wave signal and negative polarity pulses at positions corresponding to falls in the recorded square wave signal, because of the differential characteristic of the control head 34. Only the positive polarity pulses of the reproduced control pulse signal a are used for the control operation described before, and the negative polarity pulses are unused. This means that the normal control operation can be guaranteed as long as the positive polarity pulses of the reproduced control pulse signal a remain unchanged, and the data are recorded on the control track by appropriately varying the duty cycle of the negative polarity pulses of the reproduced control pulse signal a. Hereunder, the positive polarity pulses of the reproduced control pulse signal a will be referred to as reference pulses.

In order to vary the duty cycle of the negative polarity pulses of the reproduced control pulse signal a without changing the reference pulses, the data recording or rewriting (including erasing) must be prohibited during time intervals corresponding to the reference pulses and during slight intervals before and after each interval corresponding to the reference pulse. Further, an interval between two successive reference pulses must be erased, and the negative pulses must be rewritten. To achieve all of these, the microcomputer 12 generates a switching pulse signal b shown in FIG. 3(B), and applies this switching pulse signal b from a terminal COMREC ENABLE to a switching circuit 33 so as to turn this switching circuit 33 ON during a high-level period of the switching pulse signal b.

Figure 3:
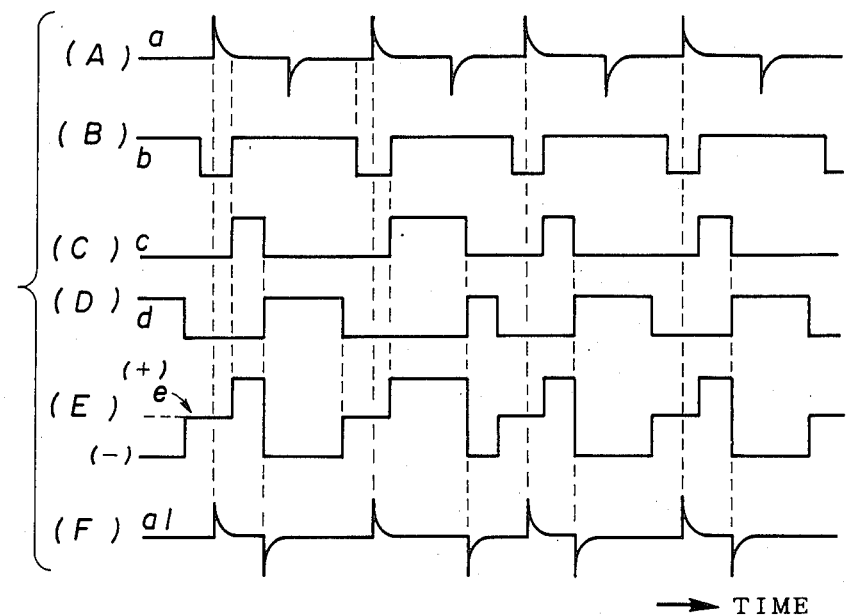
FIGS. 3(A) through 3(F) and FIGS. 4(A) through 4(D) are timing charts for explaining the operation of the previously proposed magnetic recording and reproducing apparatus shown in FIG. 2.

At the same time, the microcomputer 12 generates a pulse signal c shown in FIG. 3(C) which rises at the rising edges of the switching pulse signal b and falls after a time period which is dependent on the value of each bit of the data to be recorded and is shorter than the high-level period of the switching pulse signal b, and a pulse signal d shown in FIG. 3(D) which rises at the falling edges of the pulse signal c and falls immediately before the falling edges of the switching pulse signal b so that the negative polarity pulses of the reproduced control pulse signal a can be erased. The pulse signal c is applied from a terminal RECCTL1 to a recording control circuit 31, and the pulse signal d is applied from a terminal RECCTL2 to the recording control circuit 31.

The pulse signals c and d are passed through the recording control circuit 31, a driving amplifier 32 and the switching circuit 33, and is supplied to the control head 34 so that a recording current e shown in FIG. 3(E) flows through the control head 34. The recording current e flows in a positive direction during the high-level period of the pulse signal c and flows in a negative direction during a high-level period of the pulse signal d, but does not flow during the low-level period of the switching pulse signal b when both the pulse signals c and d have low levels and the switching circuit 33 is OFF.

As a result, the reference pulses of the reproduced control pulse signal a remain unchanged, the negative polarity pulses are erased by the positive or negative recording current e, and a negative polarity pulse is newly recorded at a point when the flowing direction of the recording current e changes from the positive direction to the negative direction. The data recording or rewriting is repeated until the recording of all of the bits of the data to be recorded is completed. When the pre-recorded magnetic tape having the negative polarity pulses rewritten in this manner is played, a reproduced control pulse signal a1 having a waveform shown in FIG. 3(F) is obtained.

The reproduced control pulse signal a1 has a period of one frame of the video signal and the positions of the reference pulses are identical to those of the originally reproduced control pulse signal a shown in FIG. 3(A). However, the duty cycle of the reproduced control pulse signal a1 (that is, the negative polarity pulses) has a first value when the bit of the data to be recorded is "1", a second value when the bit of the data to be recorded is "0", and an intermediate third value when no data is recorded. Identical data are repeatedly recorded three times with a predetermined signal format.

When the low-level signal from the data select switch SW1 is applied to the terminal INDEX of the microcomputer 12, negative pulses are continuously recorded with a predetermined short duty cycle for a constant number of times, and these negative pulses constitute the index signal.

The data may be recorded on the control track during a recording mode of the VTR 11. In this case, the pulse width of the control pulse signal (that is, square wave signal) is modulated depending on the data to be recorded, and the control pulse signal having the modulated pulse width is recorded on the control track. The recording of the data on the control track may be started when the comment rewrite switch 27a is closed, or by appropriately modifying the software of the microcomputer 12 according to the needs.

Next, a description will be given on a search operation using the data written (recorded) on the control track. The search operation may be carried out when the magnetic tape is in the predetermined tape path in contact with the rotary drum and also when the magnetic tape is accommodated within the tape cassette and is not drawn out therefrom. In either case, the microcomputer 12 discriminates whether or not the comment-on-screen switch 28 is in the "ON" position. A switch 28a shown in FIG. 2 is turned ON when the comment-on-screen switch 28 is in the "ON" position. When the comment-on-screen switch 28 is in the "ON" position, the microcomputer 12 stores in its internal memory (RAM) a search comment data which is inputted from the keyboard 18 (or from the character keys of the manipulation part 16), and the microcomputer 12 controls the character generator 14 so that the character generator 14 generates the characters of the comment which is to be searched.

An output signal of the character generator 14 is supplied to an adding circuit 43 and is added to a reproduced video signal which is reproduced from the pre-recorded magnetic tape on the VTR 11 and is obtained through an input terminal 44. An output added signal of the adding circuit 43 is outputted through an output terminal 45 and is supplied to the monitoring display unit 21 to be displayed on the screen 29.

Thereafter, the microcomputer 12 sets the VTR 11 to a fast-forward mode or a rewind mode, and reads the data recorded on the control track by detecting the duty cycle of the control pulse signal (negative polarity pulses) reproduced from the control track in the set mode. The microcomputer 12 compares the read data with the input data stored in the data memory, and carries out a control so as to set the VTR 11 to the reproduction mode and then to a desired reproduction mode when the two compared data coincide two or more times.

Figure 4:
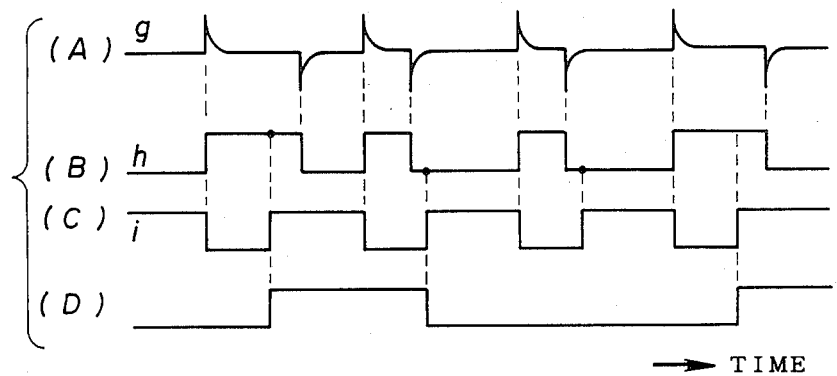

Next, a description will be given on the reading (reproduction) of the data recorded on the control track. In the fast-forward and rewind modes, the pre-recorded magnetic tape is transported at a high speed in the state accommodated within the tape cassette. For this reason, it is impossible to reproduce the control pulse signal from the control track by the control head 34 which makes contact only with a front side of the pre-recorded magnetic tape in the predetermined tape path, where the front side is the side coated with a magnetic layer. But in the fast-forward and rewind modes, it is possible to reproduce the control pulse signal by a magnetoresistor head 39 which is arranged at such a position that the magnetoresistor head 39 makes contact with a back side of the pre-recorded magnetic tape which is accommodated with the tape cassette. The reproduction of the control pulse signal from the back side of the magnetic tape is possible, because the control pulse signal is recorded in a bottom (deep) portion of the magnetic layer due to the relatively low frequency thereof. A reproduced control pulse signal from the magnetoresistor head 39 is passed through an amplifier 40 shown in FIG. 4 and is supplied to a Schmitt trigger circuit 41 shown in FIG. 2.

The Schmitt trigger circuit 41 generates a pulse signal h shown in FIG. 4(B) which rises responsive to the positive polarity pulses of a reproduced control pulse signal g shown in FIG. 4(A) and falls responsive to the negative polarity pulses of the reproduced control pulse signal g. The pulse signal h is supplied to the microcomputer 12 through a switching circuit 37 which is connected to a terminal UNLOAD in the fast-forward and rewind modes responsive to a switching signal from a terminal 38. On the other hand, a timing generator 42 generates a timing pulse signal i shown in FIG. 4(C) which rises with a timing of the reproduced control pulse signal g having an intermediate duty cycle between maximum and minimum duty cycles thereof and falls with a timing of the reference pulses.

The microcomputer 12 latches the pulse signal h at the rising edges of the timing pulse signal i, and enters the detected data shown in FIG. 4(D). The detected data are processed according to a predetermined format by a hardware or software so as to read the data written on the control track. The value of the data read from the control track is considered to be a true value when the same value is successively obtained two or more times. The data having the true values are supplied to the monitoring display unit 21 through the character generator 14, the adding circuit 43 and the output terminal 45, and are displayed on the monitoring display unit 21. Similar operations are carried out in the scroll display mode when a switch 28b shown in FIG. 2 is turned ON.

Normally, when changing the position of the comment-on-screen switch 28 to the "SCROLL" position, the VTR 11 is in a normal reproduction mode other than a special (speed-change) reproduction mode, and the pre-recorded magnetic tape is in the predetermined tape path. Hence, the reproduced control pulse signal from the control head 34 is supplied to the microcomputer 12 through an amplifier 35, a Schmitt trigger circuit 36 and the switching circuit 37, and the recorded comment data are detected similarly as in the fast-forward and rewind modes.

The data read from the control track are successively stored in the data memory of the microcomputer 12. On the other hand, when the position of the comment-on-screen switch 28 is changed to the "SCROLL" position, the data read from the control track are displayed within the area 22 on the screen 29 of the monitoring display unit 21.

Next, a description will be given on a case where the tape speed mode is changed from the standard play (SP) mode to the extended play (EP) mode. When the data are recorded on the control track in the reproduction mode, the switching pulse signal is produced from the reproduced reference pulses and the input of the amplifier 35 is switched by the switching pulse signal for the purpose of supplying the reference pulses to the head servo system or the tape transport (capstan servo) system of the VTR 11. But when the tape speed mode of the VTR 11 is changed from the standard play mode to the extended play mode, the timing of the switching pulse signal remains unchanged from that in the standard play mode although the period of the reproduced reference pulses becomes shorter than that in the standard play mode. For this reason, it is impossible to detect the change in the tape speed mode from the standard play mode to the extended play mode, and there is a problem in that a correct control operation cannot be carried out in the head servo system and the tape transport system of the VTR 11 based on the reproduced control pulse signal because the reference pulses of the extended play mode drop out.

On the other hand, when the tape speed mode of the VTR is changed from the extended play mode to the standard play mode, the timing with which the data on the control track are recorded or rewritten during the reproduction mode is constant and remains unchanged from that in the extended play mode. For this reason, there is no guarantee that the data on the control track will be correctly recorded or rewritten by intended data, that is, that the duty cycle of the control pulse signal (negative polarity pulses) will be varied to a desired duty cycle when the tape speed mode changes.

Accordingly, the present invention eliminates these problems by stopping a data recording operation when it is detected that a tape speed mode is changed from a standard play mode to an extended play mode or vice versa, so that it is possible to minimize dropout of the reference pulses of the reproduced control pulse signal after the tape speed mode is changed and to also minimize erroneous recording of data.

Figure 5:
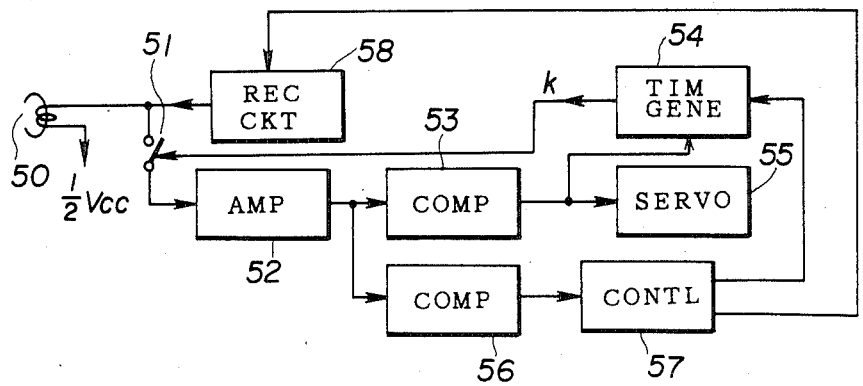
FIG. 5 is a system block diagram showing a first embodiment of the magnetic recording and reproducing apparatus according to the present invention.

First, a description will be given on a first embodiment of the magnetic recording and reproducing apparatus according to the present invention. The perspective view of the first embodiment of the magnetic recording and reproducing apparatus is essentially the same as that shown in FIG. 1 described before. FIG. 5 shows the first embodiment. In FIG. 5, a switching circuit 51 is turned ON and OFF by a switching pulse signal from a timing generating circuit 54, and supplies a reproduced control pulse signal from a control head 50 to an amplifier 52. A comparator 53 and the timing generating circuit 54 cooperate to generate from the timing generating circuit 54 the switching pulse signal which has a pulse width which is sufficiently long so that it is possible to extract only the reference pulses (positive polarity pulses) of the reproduced control pulse signal in the standard play mode in which the period of the reproduced control pulse signal is relatively long. A comparator 56 and a control circuit 57 cooperate to generate from the timing generating circuit 54 the switching pulse signal which maintains the switching circuit 51 OFF by detecting the negative polarity pulses of the reproduced control pulse signal when the tape speed mode changes to extended play mode in which the period of the reproduced control pulse signal is relatively short. Hence, the change in the tape speed mode from the standard play mode to the extended play mode can be detected in the comparator 56, and the data recording or rewriting operation can be stopped by the control circuit 57 so as to prevent dropout of the reference pulses after the tape speed mode changes to the extended play mode.

The reproduced control pulse signal obtained through the comparator 53 is also supplied to a known servo circuit 55 of the head servo system and the tape transport (capstan servo) system.

In FIG. 5, the control head 50, the amplifier 52 and the comparator 53 respectively correspond to the control head 34, the amplifier 35 and the Schmitt trigger circuit 36 shown in FIG. 2. The control circuit 57 essentially corresponds to the microcomputer 12 shown in FIG. 2, and the recording circuit 58 corresponds to the combination of the switching circuit 33, the driving amplifier 32 and the recording control circuit 31 shown in FIG. 2.

In the reproduction mode, the switching circuit 51 is turned ON and the recording or rewriting of data on the control track can be carried out by the recording circuit 58. First, in the standard play mode, the reproduced control pulse signal from the control head 34 circuit 51, and the amplified reproduced control pulse signal is supplied to the comparator 53 wherein only the reference pulses are detected. The detected reference pulses from the comparator 53 having the relatively long period are supplied to the timing generating circuit 54 and to the servo circuit 55. Hence, a known head servo operation and a known capstan servo operation are carried out.

Figure 6:
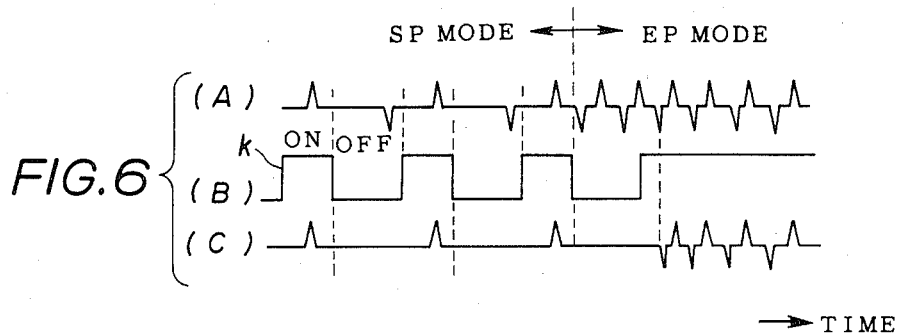
FIGS. 6(A) through 6(C) are timing charts for explaining the operation of the first embodiment.

Based on the detected reference pulses, the timing generating circuit 54 generates a switching pulse signal k shown in FIG. 6(B) which rises to a high level before the following reference pulses from the comparator 53 and falls to a low level after the following reference pulses. The reference pulses are the positive polarity pulses of the reproduced control pulse signal shown in FIG. 6(A). In FIG. 6(A), the reproduced control pulse signal obtained in the standard play (SP) mode is shown on the left and side, and the reproduced control pulse signal obtained in the extended play (EP) mode is shown on the right hand side. When the tape speed mode changes from the standard play mode to the extended play mode, the period of the reproduced control pulse signal becomes approximately ⅓ that in the standard play mode as shown in FIG. 6(A). For this reason, the timing with which the switching pulse signal k rises to the high level is set at approximately 80% of the period of the reproduced control pulse signal obtained in the standard play mode after the detected reference pulses so that a negative polarity pulse of the reproduced control pulse signal occurring thirdly at the latest after the change from the standard play mode to the extended play mode can be detected without fail.

The switching pulse signal k is supplied to the switching circuit 51 to control the ON and OFF states thereof, and only the reference pulses shown in FIG. 6(C) are extracted and supplied to the amplifier 52 by turning the switching circuit 51 ON and OFF.

When the tape speed mode changes to the extended play mode during the data recording operation, the negative polarity pulses occurring at every third period of the reproduced control pulse signal from the time when the tape speed mode is changed to the extended play mode are obtained from the amplifier 52, because the timing of the switching pulse signal k is set as described before. The negative polarity pulses are detected in the comparator 56 and are supplied to the control circuit 57 which stops the data recording operation of the recording circuit 58 and controls the operating timing of the timing generating circuit 54. Accordingly, a high-level switching pulse signal k is obtained from the timing generator 54 so as to maintain the switching circuit 51 in the ON state. As a result, the reference pulses of the extended play mode having the relatively short period are obtained from the amplifier 52.

Therefore, according to the present embodiment, it is possible to detect the change in the tape speed mode from the standard play mode to the extended play mode and stop the data recording operation when this change is detected. For this reason, it is possible to minimize the dropout of the reference pulses after the tape speed mode is changed to within two reference pulses.

Figure 7:
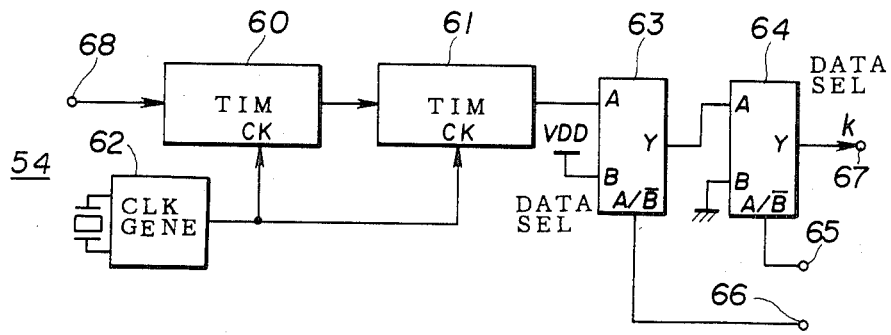
FIG. 7 is a system block diagram showing a first embodiment of a timing generating circuit of the first embodiment.

Next, a description will be given on a first embodiment of the timing generating circuit 54, by referring to FIG. 7. In FIG. 7, the timing generating circuit 54 generally comprises timer circuits 60 and 61, a clock generator 62, and data selectors 63 and 64 each having input terminals A and B. The data selectors 63 and 64 are designed so that a signal supplied to the input terminal A is selectively outputted from an output terminal Y when a high-level control signal is applied to a terminal A/$\overline{\text{B}}$, and a signal supplied to the input terminal B is selectively outputted from the output terminal Y when a low-level control signal is applied to the terminal A/$\overline{\text{B}}$. A low-level control signal from the control circuit 57 is applied to a terminal 65 and is supplied to the terminal A/$\overline{\text{B}}$ of the data selector 64 in the recording mode. A high-level control signal from the control circuit 57 from the control circuit 57 is applied to the terminal 65 in the reproduction mode. Furthermore, a high-level control signal from the control circuit 57 is applied to a terminal 66 and is supplied to the terminal A/$\overline{\text{B}}$ of the data selector 63 in the data recording (or rewriting) mode, and a low-level control signal from the control circuit 57 is otherwise applied to the terminal 66. A clock pulse signal from the clock generator 62 is supplied to clock terminals CK of the timer circuits 60 and 61.

In the recording mode of the VTR 11, the data selector 64 selectively outputs from the output terminal Y thereof a low-level signal since a low-level control signal is applied to the terminal 65. This low-level signal from the data selector 64 is supplied to the switching circuit 51 shown in FIG. 5 through an output terminal 67 as the switching pulse signal k, and the switching circuit 51 is turned OFF.

In the reproduction mode of the VTR 11, the data selector 64 selectively outputs from the output terminal Y thereof a signal applied to the input terminal A thereof because a high-level control signal is applied to the terminal 65. The signal applied to the input terminal A of the data selector 64 is a signal outputted from the output terminal Y of the data selector 63. In modes other than the data recording mode, a low-level control signal is applied to the terminal 66 and a high-level signal is selectively outputted from the output terminal Y of the data selector 63. Consequently, a high-level signal is obtained from the output terminal 67, and the switching circuit 51 is turned ON.

Figure 8:
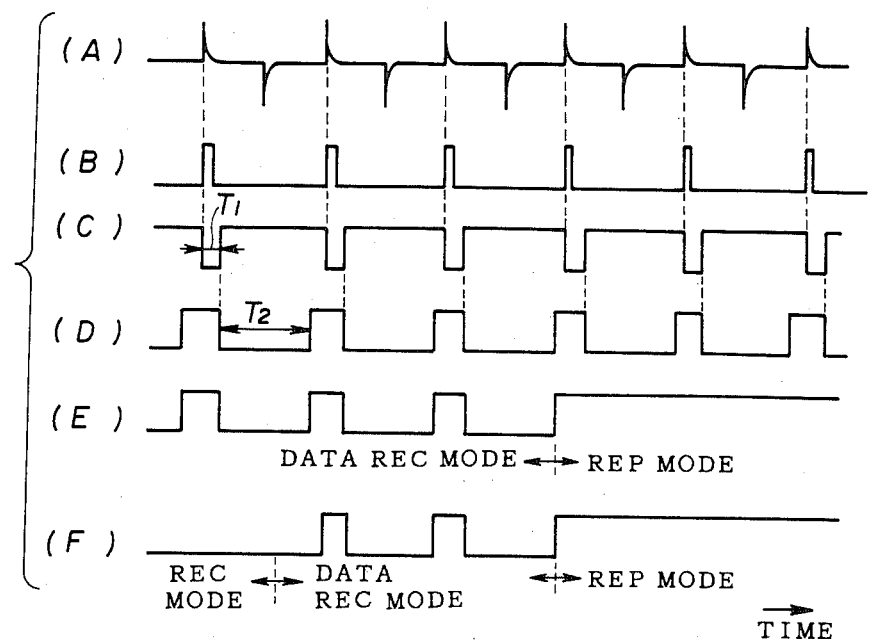
FIGS. 8(A) through 8(F) are timing charts for explaining the operation of the first embodiment of the timing generating circuit.

When the data recording operation is carried out in the reproduction mode, high-level control signals are applied to the terminals 65 and 66. Hence, a signal applied to the input terminal A of the data selector 63, that is, an output signal of the timer circuit 61, is outputted from the output terminal 67. The reference pulses (positive polarity pulses) shown in FIG. 8(B) of the reproduced control pulse signal shown in FIG. 8(A) are applied to an input terminal 68 from the comparator 53 shown in FIG. 5. The reference pulses are supplied to the timer circuit 60 as a start pulse signal. As shown in FIG. 6(C), the timer circuit 60 generates a pulse signal which rises at the rises of the reference pulses and falls after a time T1. The time T1 is set by counting the clock pulses from the clock generator 62 for a time amounting to the time T1. The time T1 corresponds to the pulse width of the switching pulse signal after the reference pulse, and is set to 2 msec to 3 msec so as to avoid undesirable effects of noise.

The output pulse signal of the timer circuit 60 is supplied to the timer circuit 61 as a start pulse signal. Similarly as in the case of the timer circuit 60, the timer circuit 61 generates a pulse signal shown in FIG. 8(D) which rises at rises of the pulse signal shown in FIG. 8(C) and falls after a time T2. The time T2 is set so that a sum T1+T2 is approximately 27 msec to 28 msec. The sum T1+T2 is set to such a range in order to make the third negative polarity pulse from the time when the tape speed mode is changed from the standard play mode to the extended play mode occur within the high-level period of the switching pulse signal shown in FIG. 6(C), and to reserve the data recording or rewriting time as in the conventional case. FIGS. 8(E) and 8(F) respectively show the output signals of the data selectors 63 and 64 in correspondence with FIGS. 8(A) through 8(D).

As described before, the output of the comparator 56 is inverted when the negative polarity pulse is detected in the comparator 56 during the data recording operation. The microcomputer constituting the control circuit 57 watches the output of the comparator 56 and changes the level of the control signal supplied to the timing generating circuit 54 immediately when the output of the comparator 56 is inverted. In other words, the microcomputer changes the level (polarity) of the control signal applied to the terminal 66 shown in FIG. 7 from the high level to the low level when the inversion of the output of the comparator 56 is detected. At the same time, the microcomputer supplies a control signal to the recording circuit 58 to turn OFF a switching circuit corresponding to the switching circuit 33 shown in FIG. 2 so as to disconnect a driving amplifier corresponding to the driving amplifier 32 from the control head 50.

Figure 9:
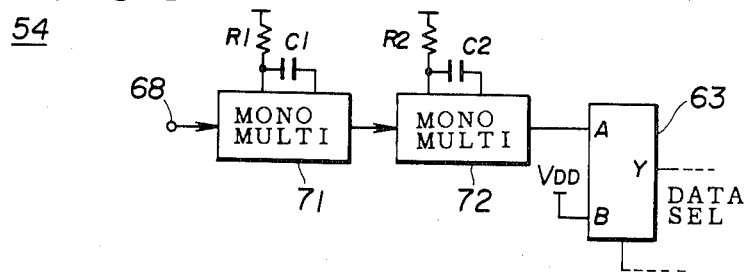
FIGS. 9 and 10 are system block diagrams showing essential parts of second and third embodiments of the timing generating circuit, respectively.

FIG. 9 shows an essential part of a second embodiment of the timing generating circuit 54. In FIG. 9, those parts which are the same as those corresponding parts in FIG. 7 are designated by the same reference numerals, and a description thereof will be omitted. In FIG. 9, monostable multivibrators 71 and 72 are provided in place of the timer circuits 60 and 61 shown in FIG. 7. The monostable multivibrator 71 outputs the pulse signal shown in FIG. 8(C) in response to the incoming reference pulses shown in FIG. 8(B), and the monostable multivibrator 72 outputs the pulse signal shown in FIG. 8(D) in response to the incoming pulse signal shown in FIG. 8(C). The time T1 is determined by a time constant dependent on a resistor R1 and a capacitor C1 coupled externally to the monostable multivibrator 71. Similarly, the time T2 is determined by a time constant dependent on a resistor R2 and a capacitor C2 coupled externally to the monostable multivibrator 72. According to this second embodiment of the timing generating circuit 54, it is unnecessary to provide the clock generator 62 shown in FIG. 7, but it is necessary to use as the resistors R1 and R2 and the capacitors C1 and C2 resistors and capacitors having stable characteristics with respect to an ambient temperature change because the times T1 and T2 would otherwise change.

Figure 10:
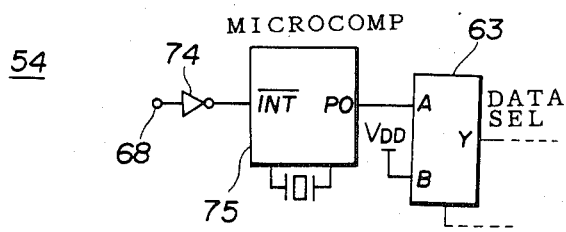

FIG. 10 shows an essential part of a third embodiment of the timing generating circuit 54. In FIG. 10, those parts which are the same as those corresponding parts in FIG. 7 are designated by the same reference numerals, and a description thereof will be omitted. In FIG. 10, a microcomputer 75 having a timer function is used in place of the tier circuits 60 and 61 shown in FIG. 7. In case where the microcomputer used for the control circuit 57 has the timer function, this microcomputer may be used as the microcomputer 75 to thereby reduce the cost of the apparatus. The reference pulses applied to the input terminal 68 are applied to an interrupt terminal $\overline{INT}$ of the microcomputer 75 through an inverter 74. The microcomputer 75 is interrupted by a falling edge of an interrupt signal applied to the interrupt terminal $\overline{INT}$, and in the present embodiment, the microcomputer 75 is interrupted at the rising edges of the reference pulses shown in FIG. 8(B). The microcomputer 75 outputs a high- level signal from an output port PO when interrupted, and starts to count down after loading a value corresponding to the time T1 into a built-in timer of the microcomputer 75. The microcomputer 75 outputs a low-level signal from the output port PO when the built-in timer counts down to zero, and starts to count down after loading a value corresponding to the time T2 into the built-in timer. Thereafter, the microcomputer 75 outputs a high-level signal from the output port PO when the built-in timer counts down to zero, and waits for the next interrupt. These operations of the microcomputer 75 are repeated so as to carry out the functions of the timer circuits 60 and 61 shown in FIG. 7.

Figure 11:
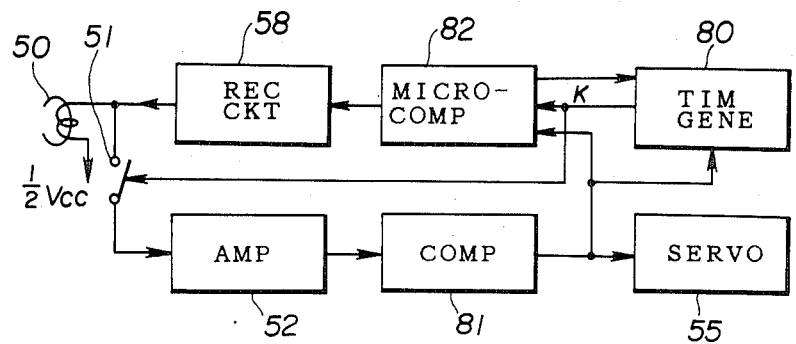
FIG. 11 is a system block diagram showing a second embodiment of the magnetic recording and reproducing apparatus according to the present invention.

Next, a description will be given on a second embodiment of the magnetic recording and reproducing apparatus according to the present invention. The perspective view of the second embodiment of the magnetic recording and reproducing apparatus is essentially the same as that shown in FIG. 1 described before. FIG. 11 shows the second embodiment. In FIG. 11, those parts which are the same as those corresponding parts in FIG. 5 are designated by the same reference numerals, and a description thereof will be omitted.

In FIG. 11, the switching circuit 51 is turned ON and OFF by a switching pulse signal from a timing generating circuit 80, and supplies a reproduced control pulse signal from the control head 50 to the amplifier 52. A comparator 81 and the timing generating circuit 80 cooperate to generate from the timing generating circuit 80 the switching pulse signal which has such a pulse width that it is possible to extract only the reference pulses (positive polarity pulses) of the reproduced control pulse signal in the extended play mode in which the period of the reproduced control pulse signal is relatively short. A microcomputer 82 carries out a counting operation responsive to a rise in the switching pulse signal, and the counting operation is forcibly stopped by the reference pulses of the control pulse signal. In addition, the count is set to a value corresponding to the pulse width of the switching pulse signal and the counting operation is automatically stopped responsive to a fall in the switching pulse signal. When the tape speed mode changes from the extended play mode to the standard play mode in which the period of the reproduced control pulse signal is relatively long, the microcomputer 82 automatically stops the counting operation so as to stop the recording of data on the control track. Hence, the change in the tape speed mode from the extended play mode to the standard play mode can be detected in a built-in timer and the like of the microcomputer 82, and the data recording operation can be stopped by the microcomputer 82 so as to prevent erroneous recording of data after the tape speed mode changes to the standard play mode.

In FIG. 11, the control head 50, the amplifier 52 and the comparator 81 respectively correspond to the control head 34, the amplifier 35 and the Schmitt trigger circuit 36 shown in FIG. 2. The microcomputer 82 corresponds to the microcomputer 12 shown in FIG. 2, and the recording circuit 58 corresponds to the combination of the switching circuit 33, the driving amplifier 32 and the recording control circuit 31 shown in FIG. 2.

In the reproduction mode, the switching circuit 51 is turned ON and the recording or rewriting of data on the control track can be carried out by the recording circuit 58. First, in the extended play mode, the reproduced control pulse signal from the control head 34 is supplied to the amplifier 52 through the switching circuit 51, and the amplified reproduced control pulse signal is supplied to the comparator 81 wherein only the reference pulses are detected. The detected reference pulses from the comparator 81 having the relatively short period are supplied to the timing generating circuit 80, the microcomputer 82 and the servo circuit 55. Hence, a known head servo operation and a known capstan servo operation are carried out in the servo circuit 55.

Figure 12:
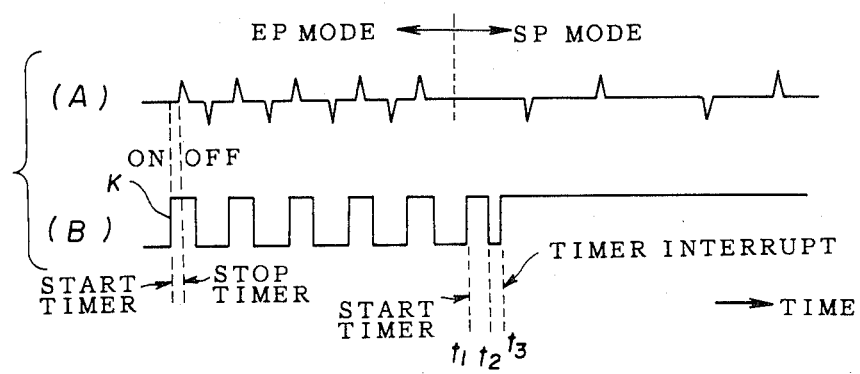
FIGS. 12(A) and 12(B) are timing charts for explaining the operation of the second embodiment.

The timing generating circuit 80 generates a switching pulse signal K shown in FIG. 12(B) which rises to a high level before the reference pulses from the comparator 81 and falls to a low level after the reference pulses. The reference pulses are the positive polarity pulses of the reproduced control pulse signal shown in FIG. 12(A). In FIG. 12(A), the reproduced control pulse signal obtained in the extended play (EP) mode is shown on the left hand side, and the reproduced control pulse signal obtained in the standard play (SP) mode is shown on the right hand side. When the tape speed mode changes from the extended play mode to the standard play mode, the period of the reproduced control pulse signal becomes approximately three times that in the extended play mode as shown in FIG. 12(A).

The switching pulse signal K is supplied to the switching circuit 51 to control the ON and OFF states thereof, and only the reference pulses are extracted and supplied to the amplifier 52 by turning the switching circuit 51 ON and OFF.

Figure 13:
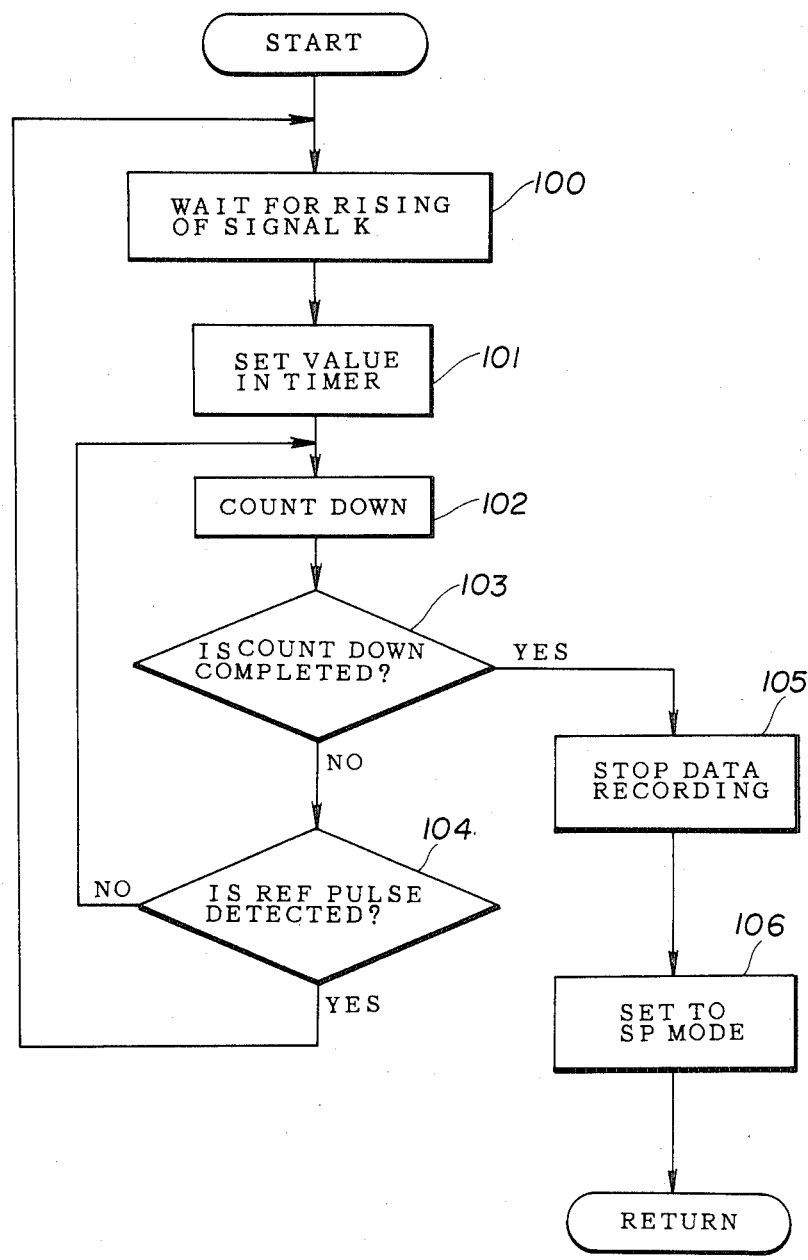
FIG. 13 is a flow chart for explaining the operation of a microcomputer of the second embodiment.

The microcomputer 82 comprises a built-in timer (or counter means), and the count of this built-in timer is set to such a value that a countdown operation of the built-in timer ends while the switching circuit 51 is turned ON by the high-level switching pulse signal K, that is, while the reference pulses are detected. The microcomputer 82 has a function of carrying out an interrupt routine when the countdown operation ends. FIG. 13 shows a routine of the microcomputer 82.

In FIG. 13, a step 100 waits for a rise in the switching pulse signal K. A step 101 sets such a value in the built-in timer of the microcomputer 82 that the countdown operation ends during a time period in which the switching circuit 51 is ON, and a step 102 executes the countdown operation to decrement the set value by one. A step 103 discriminates whether or not the countdown operation is completed. When the discrimination result in the step 103 is NO, a step 104 discriminates whether or not the reference pulse is detected. When the reference pulse is not detected and the discrimination result in the step 104 is NO, the operation returns to the step 102. Thus, the countdown operation is continued by the loop of the steps 102, 103, 104 and 102 until the reference pulse is detected or the countdown operation is completed without the reference pulse detected. When the reference pulse is detected and the discrimination result in the step 104 is YES, the operation returns to the step 100 and waits for the next rise in the switching pulse signal K.

When the tape speed mode changes from the extended play mode to the standard play mode, the period of the reproduced control pulse signal becomes approximately three times that in the extended play mode as described before. For this reason, the reference pulses are not detected during the time period in which the switching circuit 51 is ON, that is, during the high-level period of the switching pulse signal K shown in FIG. 12(B). As a result, the built-in timer which starts the countdown operation at a time $t_1$ is not stopped during the time period in which the switching circuit 51 is ON, and completes the countdown operation at a time $t_2$. And, the discrimination result in the step 103 becomes YES and a step 105 is started at a time $t_3$.

At this stage, the microcomputer 82 confirms by the routine that the tape speed mode is changed to the standard play mode, and the step 105 shown in FIG. 13 stops the data recording operation of the recording circuit 58. Next, a step 106 sets indicators, tape transport speed and the like of the VTR 11 to the setting for the standard play mode.

When the data recording operation is stopped, a high-level switching pulse signal K is obtained from the timing generating circuit 80, and the switching circuit 51 is maintained in the ON state. Hence, the reference pulses of the standard play mode having the relatively long period are obtained from the amplifier 52.

Therefore, according to this second embodiment, it is possible to detect the change in the tape speed mode from the extended play mode to the standard play mode, and to stop the data recording operation when this change is detected. Accordingly, the data becomes unstable only for one period of the control pulse signal at the maximum after the tape speed mode is changed to the standard play mode.

The circuit construction of the timing generating circuit 80 may be essentially the same as that of the timing generating circuit 54 of the first embodiment described before.

Further, the present invention is not limited to these embodiments, but various variations and modifications may be made without departing from the scope of the present invention.

What is claimed is:

1. A magnetic recording and reproducing apparatus having a function of recording data on a control track of a magnetic tape by varying a duty cycle of a control pulse signal which has a constant period and is recorded on the control track, said control track extending along a longitudinal direction of the magnetic tape, said magnetic recording and reproducing apparatus comprising:
   a control head for recording and reproducing the control pulse signal on and from the control track of the magnetic tape;
   switching means controlled to ON and OFF states responsive to a switching pulse signal for passing a reproduced control pulse signal reproduced from the control track by said control head in the ON state thereof, said reproduced control pulse signal being made up of first polarity pulses and second polarity pulses;
   recording means for recording the data on the control track by said control head by varying the duty cycle of the control pulse signal in the OFF state of said switching means;
   timing generating means for generating the switching pulse signal, said switching pulse signal having a pulse width which is sufficiently long so that only the first polarity pulses of the reproduced control pulse signal from said switching means can be extracted in a first tape speed mode in which a period of the reproduced control pulse signal is relatively long and the switching pulse signal is generated based on the extracted first polarity pulses; and
   control means for detecting the second polarity pulses of the reproduced control pulse signal when the tape speed mode changes to a second tape speed mode in which the period of the reproduced control pulse signal is relatively short and for controlling said timing generating means responsive to the second polarity pulses so that said timing generating means generates a switching pulse signal for maintaining said switching means in the ON state.

2. A magnetic recording and reproducing apparatus as claimed in claim 1 in which said control means controls said recording means to stop the recording of the data on the control track when said control means detects a change in the tape speed mode from the first tape speed mode to the second tape speed mode.

3. A magnetic recording and reproducing apparatus as claimed in claim 1 in which said control pulse signal is pre-recorded on the control track of the magnetic tape, and said data are recorded on the control track by varying the duty cycle of the control pulse signal while reproducing the pre-recorded control pulse signal by said control head.

4. A magnetic recording and reproducing apparatus as claimed in claim 1 in which said first and second polarity pulses of the reproduced control pulse signal are positive polarity pulses and negative polarity pulses, respectively.

5. A magnetic recording and reproducing apparatus as claimed in claim 1 in which the period of the reproduced control pulse signal in the first tape speed mode is approximately three times the period of the reproduced control pulse signal in the second tape speed mode.

6. A magnetic recording and reproducing apparatus having a function of recording data on a control track of a magnetic tape by varying a duty cycle of a control pulse signal which has a constant period and is recorded on the control track, said control track extending along a longitudinal direction of the magnetic tape, said magnetic recording and reproducing apparatus comprising:
   a control head for recording and reproducing the control pulse signal on and from the control track of the magnetic tape;
   switching means controlled to ON and OFF states responsive to a switching pulse signal for passing a reproduced control pulse signal reproduced from the control track by said control head in the ON state thereof, said reproduced control pulse signal being made up of first polarity pulses and second polarity pulses;
   recording means for recording the data on the control track by said control head by varying the duty cycle of the control pulse signal in the OFF state of said switching means;
   timing generating means for generating the switching pulse signal, said switching pulse signal having such a pulse width that only the first polarity pulses of the reproduced control pulse signal from said switching means can be extracted in a first tape speed mode in which a period of the reproduced control pulse signal is relatively short and the switching pulse signal is generated based on the extracted first polarity pulses;
   counter means for counting a predetermined set value corresponding to the pulse width of the switching pulse signal, said counter means starting a counting operation responsive to a rise in the switching pulse signal and automatically ending the counting operation responsive to a fall in the switching pulse signal, said counting operation of said counter means being forcibly stopped responsive to the first polarity pulses of the reproduced control pulse signal; and
   control means for controlling said recording means to stop the recording of the data on the control track responsive to the end of the counting operation of said counter means when the tape speed mode changes to a second tape speed mode in which the period of the reproduced control pulse signal is relatively long.

7. A magnetic recording and reproducing apparatus as claimed in claim 6 in which said control pulse signal is pre-recorded on the control track of the magnetic tape, and said data are recorded on the control track by varying the duty cycle of the control pulse signal while reproducing the pre-recorded control pulse signal by said control head.

8. A magnetic recording and reproducing apparatus as claimed in claim 6 in which said first and second polarity pulses of the reproduced control pulse signal are positive polarity pulses and negative polarity pulses, respectively.

9. A magnetic recording and reproducing apparatus as claimed in claim 6 in which the period of the reproduced control pulse signal in the first tape speed mode is approximately one-third the period of the reproduced control pulse signal in the second tape speed mode.

* * * * *